United States Patent [19]

Rogler

[11] Patent Number: 5,465,501
[45] Date of Patent: Nov. 14, 1995

[54] GAGE WITH ADJUSTABLE DEPTH STOPS FOR MEASURING DISTANCE BETWEEN TWO SPACED SURFACES

[75] Inventor: Albert Rogler, North Scituate, R.I.

[73] Assignee: Central Tools, Inc., Cranston, R.I.

[21] Appl. No.: 203,649

[22] Filed: Feb. 24, 1994

[51] Int. Cl.$^6$ .................................................. G01B 5/14
[52] U.S. Cl. ...................................... 33/810; 33/610
[58] Field of Search .............................. 33/810, 811, 812, 33/813, 600, 609, 610, 203, 203.13

[56] References Cited

U.S. PATENT DOCUMENTS

| | | | |
|---|---|---|---|
| 1,145,852 | 7/1915 | Schramm | 33/811 |
| 1,510,285 | 9/1924 | Lustenberger | 33/812 |
| 3,562,773 | 2/1971 | Wilamowski | 33/812 |
| 3,827,153 | 8/1974 | Mitchell | 33/610 |
| 5,317,814 | 6/1994 | Rogler | 33/810 |

FOREIGN PATENT DOCUMENTS

| | | | |
|---|---|---|---|
| 270487 | 6/1988 | European Pat. Off. | 33/812 |
| 351160 | 3/1922 | Germany | 33/810 |

*Primary Examiner*—William A. Cuchlinski, Jr.
*Assistant Examiner*—G. Bradley Bennett
*Attorney, Agent, or Firm*—Lackenbach Siegel Marzullo Aronson & Greenspan

[57] ABSTRACT

An adjustable gage is provided with a plurality of pairs of depth stops along the jaws or arms which support the pointed anvils which contact an internal or external cylindrical surface. By adjusting selected depth stops, an either retracted or extended positions, one pair of depth stops engages a rim or abutment surface of a cylindrical member, thereby insuring that the measurement anvils will contact diametrically opposite sides of the cylindrical surface to be measured along a plane which is substantially normal to the axis of the cylindrical surface. This avoids oblique misalignments of the gage and assures precise measurements.

16 Claims, 2 Drawing Sheets

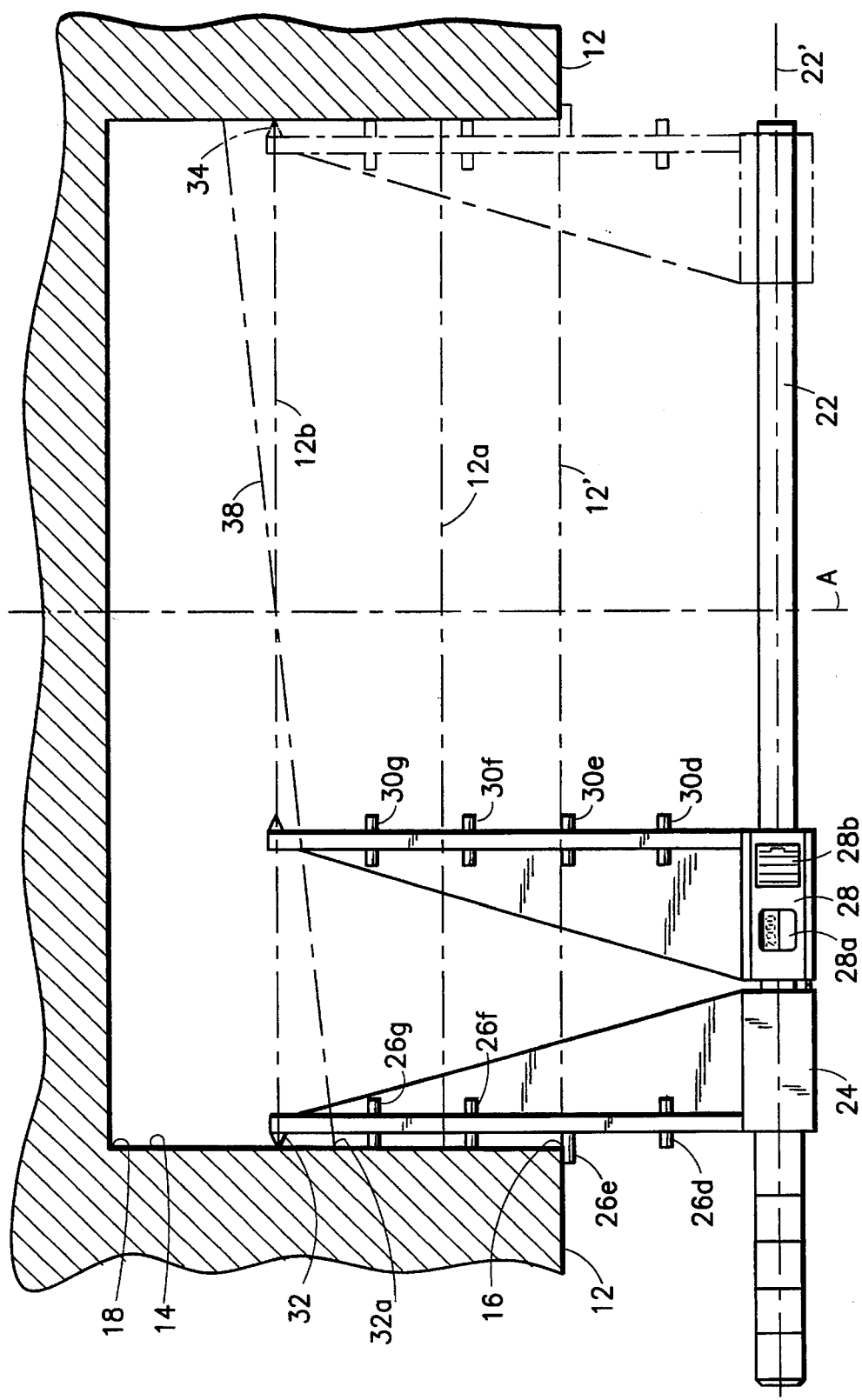

GAGE WITH ADJUSTABLE DEPTH STOPS FOR MEASURING DISTANCE BETWEEN TWO SPACED SURFACES

BACKGROUND OF THE INVENTION

This invention generally relates to measurement devices, and more particularly, an adjustable gage for accurately measuring the diameter of a cylindrical surface of a body such as a brake drum.

The problem which the present invention overcomes is best described in connection with FIG. 1, wherein a standard brake drum is designated by the reference numeral 10. The brake drum has an inner circular rim 12 and an internal cylindrical surface 14. The cylindrical surface 14 has an outer edge 16, proximate to the rim 12, and an inner edge 18. As is well known, during maintenance of such brake drums, the diameter of the cylindrical surface 14 is measured at a few points between the outer edge 16 and the inner edge 18. For proper operation of the brake drum 10, the cylindrical surface 14 must be smooth and substantially uniform in diameter along the axial surface 14 to assure proper contact with the brake shoes which abut against and engage the cylindrical surface 14.

FIG. 1 illustrates a known gage 20 of the type which has been used to measure an inside diameter of a brake drum.

The gage 20 has a bar 22 at one end of which there is secured a fixed carrier 24 which supports a fixed arm or jaw 26. The bar 22 also supports a slidably movable carrier 28 which supports a movable arm or jaw 30. At the extreme free end of the arm 26, there is provided a pointed anvil 32 which is directed or projects in a direction away from the movable arm 30, while the movable arm 30 supports a pointed anvil 34 which extends or is directed away from the arm 26. By placing the anvils 32, 34 within the cylindrical surface 14 and separating the carriers 24, 28, the anvils 32, 34 come into contact with the cylindrical surface 14. The movable carrier 28, which also contains a measurement module, provides a reading of the spacing between the two pointed anvils 32, 34. However, with a prior art gage of this type, there is frequently a problem in obtaining accurate measurements because there is no precise way to determine whether the anvils 32, 34 are on diametrically opposite ends of a plane which is transverse or normal to the axial direction or whether one of the anvils 32, 34 is further in or further out than the other anvil, thereby artificially providing a greater reading than the actual value of the true diameter. While skilled mechanics can sometimes position the scale relatively accurately, by eye, there is still no assurance that the readings are precise. To those that are not as experienced, substantially incorrect readings can result from the use of the prior art gage. Such incorrect measurements, in turn, may result in insufficient or excessive quantities of metal being cut from the cylindrical surface 14 and this, in turn, may deteriorate the operation of the drum.

SUMMARY OF THE INVENTION

Accordingly, it is an object of the present invention to provide an adjustable drum gage which does not have the disadvantages inherent in prior art drum measurement gages.

It is another object of the present invention to provide an adjustable gage for conveniently and accurately measuring the diameter of the cylindrical surface of a body, such as a brake drum.

It is still another object of the present invention to provide an adjustable gage as aforementioned which is simple in construction and inexpensive to manufacture.

It is yet another object of the present invention to provide an adjustable gage as suggested in the previous objects which allows precise measurements to be obtained both by expert mechanics or technicians as well as those with lesser experience.

In order to achieve the above objects, as well as others which will become inherent hereafter, a gage is provided for measuring the diameter of the cylindrical surface of a body having a body axis and diametrically opposite abutment surfaces at one axial end of the body arranged in a reference plane normal to the body axis. The gage comprises an elongate generally rigid bar defining a gage axis. The first and second jaws extend generally transversely to said gage axis and mounted on said bar for sliding movements relative to each other in a common plane in directions along said gage axis. Each of said jaws has a main transverse body portion, a proximate portion at one end of said main body portion slidably mounted on said bar and a remote free end portion remote from said bar. An anvil is mounted on each end portion and protrudes along a direction generally parallel to said gage axis, said anvils on said first and second jaws being aligned with each other along the lines generally parallel to said gage axis. Indicator means is provided for providing an indication corresponding to the distance between said anvils. Adjustable depth control means is provided for selectively positioning said anvils at equal distances from their associated body abutment surfaces to thereby control the positions at which both said anvils are positioned along the cylindrical surface. In this manner, said adjustable depth control means assures that each of said anvils are equally spaced from an associated body abutment surface and that said anvils are not skewed but substantially normal in relation to the body axis so that the diameter of the cylindrical surface can be accurately measured without errors due to uneven positioning to said anvils in relation to the cylindrical surface.

In accordance with a presently preferred embodiment, the adjustable depth control means comprises at least one pair of adjustable depth stops, one on each of said main jaw body portions equally spaced a predetermined distance from associated anvils and being selectively movable to clear or engage the abutment surfaces of the body to thereby selectively enable measurement of the diameter of the cylindrical surface at equal points spaced from said predetermined distance from the abutment surfaces.

BRIEF DESCRIPTION OF THE DRAWINGS

The features and advantages of the present invention will become apparent from the following description of the invention, taken together with the accompanying drawings.

FIG. 3 is a side elevational view, showing a brake drum partially in cross section to illustrate the internal cylindrical surface, and indicating the manner in which the adjustable gage drum shown in FIG. 2 is used to accurately measure the diameter of the internal cylindrical surface along different axial positions thereof.

DESCRIPTION OF THE PREFERRED EMBODIMENT

Figure 1:
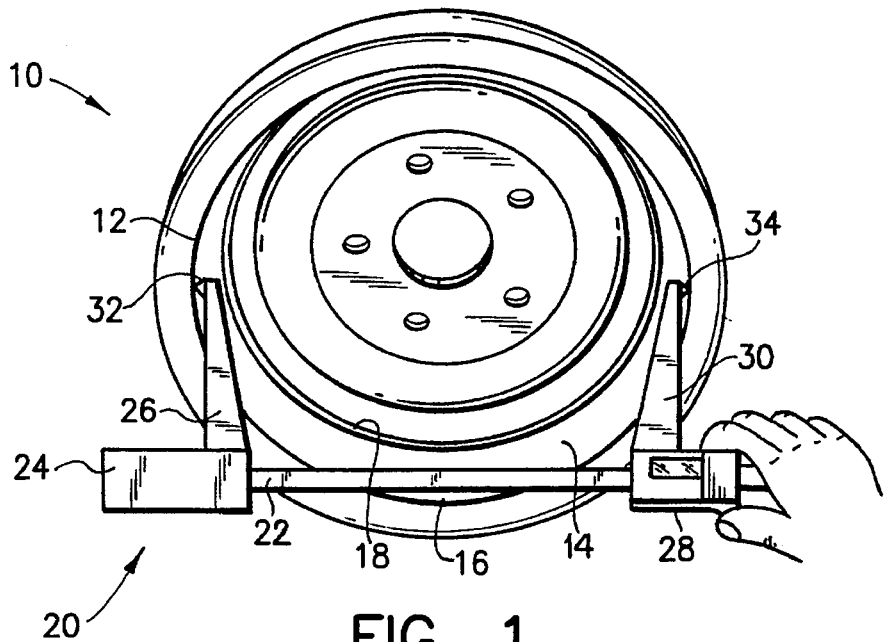
FIG. 1 is an illustration of a conventional brake drum being measured by a known adjustable gage.
Figure 2:
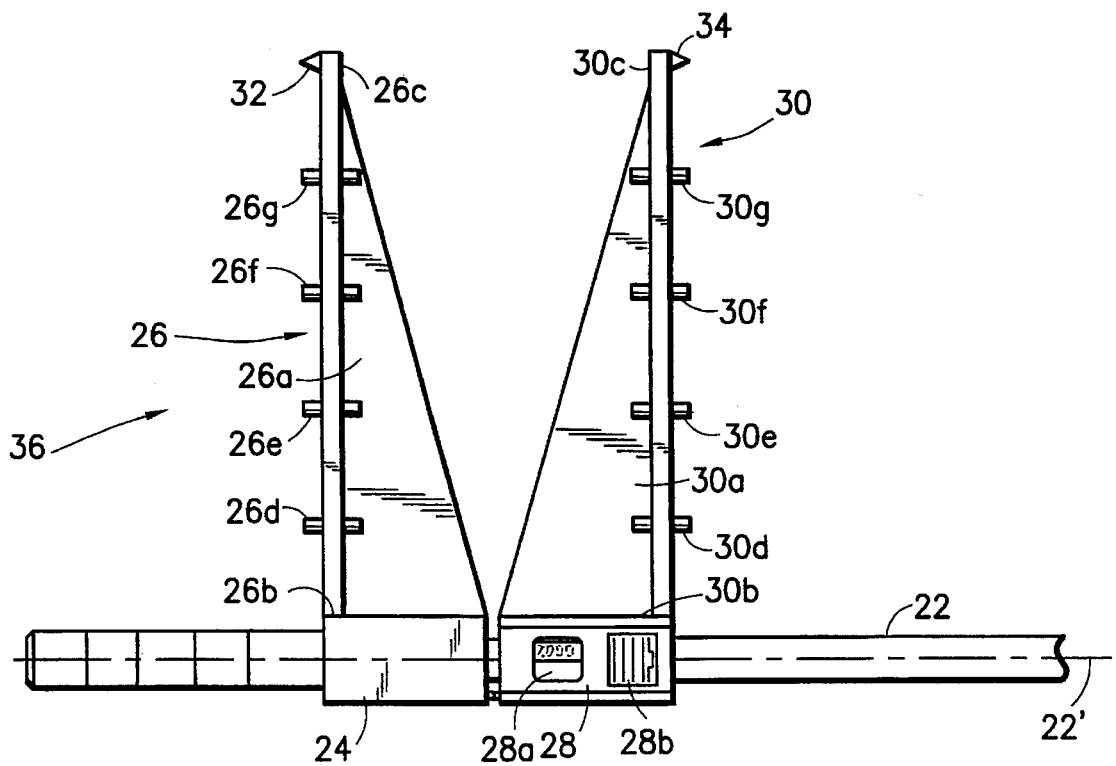
FIG. 2 is side elevational view of an adjustable gage for measuring the diameter of a cylindrical surface, such as a brake drum.

Referring now specifically to the Figures, in which identical or similar parts are designated by the same references numerals throughout, and first referring to FIG. 2, the adjustable gage in accordance with the present invention is generally designated by the reference numeral 36. As with the known gage 20, the adjustable gage 36 has an elongate generally rigid bar 22 defining a gage axis 22'. As with the known gage, a first jaw or arm 26 and a second jaw or arm 30 extend generally transversely to the gage axis 22' and are mounted on the bar 22 for sliding movements relative to each other in a common plane in directions along the gage axis. The jaws 26, 30 have respective main transverse body portions 26a, 30a; proximate portions 26b, 30b at one end mounted on the bar 22 and free end portions 26c, 30c remote from the bar 22. A pointed anvil 32 is mounted on the free end portion 26c protruding or pointing in a direction generally parallel to the gage axis 22' and away from the movable arm or jaw 30. Similarly, a pointed anvil 34 is mounted on the free end portion 30c of the jaw 30 and protrudes or is pointed along a direction generally parallel to the gage axis 22' and away from the fixed jaw 26. The anvils 32, 34 are aligned with each other along a line generally parallel to the gage axis 22' and point in opposite directions or away from each other.

The proximate portions 26b, 30b of the arms or jaws 26, 30, respectively, are mounted on associated carriers 24 and 28. The carrier 24 is generally fixed in relation to the linear bar 22, while the carrier 28 is slidably mounted and incorporates a digital display module which includes an indicator for providing an indication corresponding to the distance between the anvils 32, 34.

An important feature of the present invention is the provision of adjustable depth control means for selectively positioning the anvils 32, 34 at equal distances from associated approximate abutment portions of the rim 12 of the brake drum or other similar cylindrical member to thereby control the positions at which both anvils are positioned along the cylindrical surface. In this manner, the adjustable depth control means assures that each of the anvils are equally spaced from an associated portion of the circular rim 12 so that the anvils are not skewed but substantially normal in relation to the axis of the drum and the diameter of the cylindrical surface 14 can be accurately measured without errors due to uneven positioning of the anvils in relation to the cylindrical surface 14.

In accordance with the presently preferred embodiment, the adjustable depth control means comprises at least one pair of adjustable depth stops, one on each of the jaw main or transverse body portions 26a, 30a equally spaced predetermine distances from associated anvils 32, 34, respectively, and being selectively movable to clear or engage the circular rim 12 which form abutment surfaces to thereby enable selective measurement of the cylindrical surface at points spaced a predetermined distance from the circular rim 12. In the embodiment shown in FIG. 2, four such adjustable depth stops 26d–26g are shown provided on the fixed arm or jaw 26 and four corresponding adjustable depth stops 30d–30g provided on the movable arm or jaw 30. While it is not critical, the adjustable depth stops are preferably spaced at predetermined distances from the anvils 32, 34. Thus, the stops 26d and 30d are equally spaced from the anvils 32, 34, the same being true for stops 26e, 30e; 26f, 30f; and 26g, 30g. Also, while it is not critical, the spacings between adjacent pairs of adjustable depth stops are substantially equal as shown. In the embodiment shown, the pair or adjustable depth stops 26g, 30g which are the closest to their associated anvils 32,34 are spaced from the anvils a incremental distance. The spacing between adjacent pairs of adjustable depth stops are selected to be substantially equal to such incremental distance. Thus, with the embodiment shown, four pairs of adjustable depth stops are provided so that four separate and equally accurate or precise measurements can be made along four different axial positions of the cylindrical surface 14.

The specific construction of the depth stops is not critical for purposes of the present invention. However, in the preferred embodiment, each depth stop comprises a pin oriented parallel to the gage axis 22' and mounted on an associated main body portion of an arm or jaw 26, 30 for sliding movements between abutment surface engaging and clearing positions. Preferably, the stop pins are provided with pin retaining means for retaining the pins in selected positions to avoid movements of the pins during measurement. Such retaining means can be in the form of spring detents or any other locking mechanism for locking the pins in their selected positions.

The lengths of the jaws 26, 30 will be a function of the intended uses of the gage. However, when the gage is used to measure brake drums, the jaws can be typically ten inches long. In such an instance, the incremental distance between adjacent pairs of stop pins can be approximately two inches.

Referring to FIG. 3, the operation of the gage 36 will now will be described. In FIG. 3 the rim 12 proximate to the outer edge 16 of the cylindrical surface forms an abutment surface for the depth stops. After the jaws or arms have been inserted within the cylindrical cavity, the movable jaw or arm 30 is slidingly moved over the bar 22 so as to separate the arms or jaws to the maximum possible extent at which time the pointed anvils 32, 34 come into contact with diametrically opposite portions of the cylindrical surface 14. The dashed line 38 indicates a skewed plane which, while it may pass through the axis A of the drum, defines a distance greater than a true the diameter. Without the depth stops of the present invention, the anvils 32, 34 can be positioned at points 38a, 38b, thereby providing an imprecise measurement of the diameter of the cylindrical surface. However, by retaining the depth stops 26f, 26g, 30f, 30g inwardly retracted and moving depth stops 26e and 30e to outwardly extended positions as shown, the depth stops 26e, 30e engage the rim 12 or associated abutment surfaces as shown to assure that the anvils 32, 34 are always aligned along measurement planes which are perpendicular or normal to the axis A, such as measurement planes 12a, 12b which are parallel to the plane 12' which is defined by the circular rim 12 itself. It is clear that the first pair of outwardly extending depth stops which are the closest to the anvils 32, 34 will determine the depth to which the tool will be inserted and the portion of the cylindrical surface that will be measured. By quickly rearranging which depth stops are retracted and which are extended, a number of measurements can quickly and easily be made with uncompromising accuracy. Equally accurate measurements can be made by both those that are experienced as well as by those that are inexperienced.

The number of measurements that can be made is clearly determined by the number of pairs of depth stops that are provided along the jaws or arms 26, 30. However, it is normally adequate to provide three or four such measurements for a single brake drum.

Inactive depth stops, such as depth stops 26f, 26g, 30f and 30g in FIG. 3 must be capable of being sufficiently retracted so as to clear the rim 12 and the surface 14 itself when the anvils 32, 34 contact the cylindrical surface, while the active depth stops must be extendable sufficiently outwardly so as to engage the rim edge 12. Aside from this requirement, the extent to which the inactive depth stops clear the rim 12 or cylindrical surface 14 or the extent to which the active depth stops extend beyond the rim is not cirtical.

Although the present invention has been described in relation to a particular embodiment thereof, many other variations and modifications and other uses will become apparent to those skilled in the art. Thus, for example, while the gage 36 has been described in connection with measurements of brake drums, it is clear that the gage can be made in different sizes and with different numbers of depth stops to measure the diameter of a cylindrical surface of any body having an axis and diametrically opposite abutment surfaces at one axial end of the body arranged in a reference plane normal to the body axis. Thus, the gage can be used to measure both internal cylindrical surfaces, as has been described in connection with the brake drum. However, where the anvils protrude in directions toward each other, they can be used to measure an external diameter of a cylindrical surface, in which case the inactive depth stops will be outwardly extended to clear the external cylindrical surface, and the active depth stops will be internally retracted to engage the cylindrical body outer edge or rim from which the measurements are to be made. It is preferred, therefore, that the present invention be limited not by the specific disclosure herein, but only by the appended claims.

I claim:

1. Gage for measuring the dimension between two spaced surfaces of a body, the measurement being made a predetermined distance along a predetermined direction from abutment surfaces on the body which are arranged in a reference plane normal to said predetermined direction, the gage comprising an elongate generally rigid bar defining a gage axis; first and second jaws extending generally transversely to said gage axis and mounted on said bar for sliding movements relative to each other in a common plane in directions along said gage axis, each of said jaws having a main transverse body portion, a proximate portion at one end of said main body portion being slidably mounted on said bar and a remote free end portion being remote from said bar; and anvil mounted on each end portion and protruding along a direction generally parallel to said gage axis, said anvils on said first and second jaws being aligned with each other along a line generally parallel to said gage axis; indicator means mounted for sliding movements on said bar with one of said jaws relative to the other of said jaws for providing an indication corresponding to the distance between said anvils; and adjustable depth control means for selectively positioning said anvils at equal distances from their associated body abutment surfaces to thereby control the positions, along said predetermined directions, at which both said anvils are positioned on the spaced surfaces, relative to said abutment surfaces, said adjustable depth control means comprising at least one pair of adjustable depth stops, permanently mounted on said jaws, one on each of said main jaw body portions being equally spaced a predetermined distance from associated anvils and each being selectively movable to clear or engage an abutment surface of the body to thereby selectively enable measurement of the dimension between said spaced surfaces at points equally spaced from said abutment surfaces, whereby said adjustable depth control means assures that each of said anvils are equally spaced from an associated body abutment surface and that said anvils are not skewed but are arranged along a line substantially normal in relation to said predetermined direction, and said spaced surfaces can be accurately measured without errors due to uneven positioning of said anvils in relation to the spaced surfaces.

2. Gage as defined in claim 1, wherein said anvils protrude in opposite directions.

3. Gage as defined in claim 2, wherein said anvils protrude in directions away from each other to measure internal diameters of a cylindrical surface.

4. Gage as defined in claim 1, wherein said indicator means comprises a digital display.

5. Gage as defined in claim 1, wherein a plurality of pairs of adjustable depth stops are provided on said jaws, said pairs of adjustable depth stops being spaced at predetermined distances from said anvils.

6. Gage as defined in claim 5, wherein the spacings between adjacent pairs of adjustable depth stops are substantially equal.

7. Gage as defined in claim 5, wherein one pair of adjustable depth stops are most proximate to said anvils and spaced from said anvils an incremental distance, and the spacings between adjacent pairs of adjustable depth stops are equal to said incremental distance.

8. Gage as defined in claim 7, wherein the body to be measured is a brake drum and wherein each of said jaws is approximately 10 inches long.

9. Gage as defined in claim 8, wherein four pairs of adjustable depth stops are provided.

10. Gage as defined in claim 9, wherein said incremental distance is approximately 2 inches.

11. Gage as defined in claim 1, wherein each adjustable depth stop comprises a pin oriented parallel to said gage axis and mounted on said main body portion for sliding movement between abutment surface engaging and clearing positions.

12. Gage as defined in claim 11, further comprising pin retaining means for retaining said pins in selected positions to avoid movement during measurement.

13. Method of measuring the dimension between two spaced surfaces of a body at predetermined distances along a predetermined direction from abutment surfaces on the body which are arranged in a reference plane normal to the predetermined direction, the method steps comprising the steps of slidably moving spaced jaws of a gage permanently and slidably mounted on a bar to position anvils on the jaws into contact with the surfaces; and using the abutment surfaces as reference points to adjustably control the positions at which the anvils are positioned along the surface along said predetermined direction equal distances from the abutment surfaces, whereby equal spacing of the anvils from the associated abutment surfaces is assured and skewed positions of the anvils in relation to the body axis is avoided to thereby assure, accurate measurements of the dimension between said surfaces at desired predetermined distances from the abutment surfaces along said predetermined direction.

14. Method as defined in claim 13, wherein one of a plurality of predetermined distances of the anvils from the abutment surfaces is selected.

15. Method as defined in claim 14, wherein the increments between predetermined distances is selected to be substantially equal.

16. Method as defined in claim 13, wherein said step of adjustably controlling the positions of the anvils comprises moving pins slidably mounted on the gage jaws between abutment surface engaging and clearing positions.

* * * * *